(12) United States Patent
Yokoi (10) Patent No.: US 10,989,087 B2
(45) Date of Patent: Apr. 27, 2021

(54) PLUG-IN HYBRID VEHICLE

(71) Applicant: ISUZU MOTORS LIMITED, Tokyo (JP)

(72) Inventor: Takeshi Yokoi, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/606,645

(22) PCT Filed: Apr. 17, 2018

(86) PCT No.: PCT/JP2018/015808
§ 371 (c)(1),
(2) Date: Oct. 18, 2019

(87) PCT Pub. No.: WO2018/194046
PCT Pub. Date: Oct. 25, 2018

(65) Prior Publication Data
US 2020/0182118 A1 Jun. 11, 2020

(30) Foreign Application Priority Data
Apr. 19, 2017 (JP) .............................. JP2017-082607

(51) Int. Cl.
*F01N 3/02* (2006.01)
*F01N 3/20* (2006.01)
(Continued)

(52) U.S. Cl.
CPC .............. *F01N 3/2013* (2013.01); *B60K 6/24* (2013.01); *B60K 6/26* (2013.01); *B60K 6/28* (2013.01);
(Continued)

(58) Field of Classification Search
CPC ........ F01N 3/021; F01N 3/105; F01N 3/2013; F01N 3/2006; F02D 45/00; B60L 53/18;
(Continued)

(56) References Cited

U.S. PATENT DOCUMENTS 8,883,102 B1 * 11/2014 Lambert ............ B01D 53/9427
423/213.2
8,989,935 B2 * 3/2015 Martin .................... F02D 29/02
701/22
(Continued)

FOREIGN PATENT DOCUMENTS

JP 2010-031833 A 2/2010
JP 2011-032969 A 2/2011
(Continued)

OTHER PUBLICATIONS

English translation of Japanese Patent Application Publication No. JP 2011-162040 A (Year: 2011).*
(Continued)

*Primary Examiner* — Jason D Shanske
(74) *Attorney, Agent, or Firm* — Procopio, Cory, Hargreaves & Savitch LLP (57) ABSTRACT

Provided is a plug-in hybrid vehicle which includes an exhaust treatment unit which communicates with an engine and discharges exhaust gas generated by combustion of liquid fuel, an oxidation catalyst and an SCR which are placed in a middle part of the exhaust treatment unit to remove impurities contained in the exhaust gas, and an external charging mechanism which is electrically connected with a battery and charges the battery with external electrical power, where the external charging mechanism includes a first heater unit and a second heater unit which heat the oxidation catalyst and the SCR with electrical power stored in the battery or external electrical power when the battery is charged with the external electrical power in a (Continued)

state where the fuel-based power unit and the electrical power unit are stopped.

5 Claims, 3 Drawing Sheets

(51) Int. Cl.
| | |
|---|---|
| *B60W 20/16* | (2016.01) |
| *B60L 58/10* | (2019.01) |
| *B60L 53/18* | (2019.01) |
| *B60K 6/24* | (2007.10) |
| *B60K 6/26* | (2007.10) |
| *B60K 6/28* | (2007.10) |
| *F01N 11/00* | (2006.01) |
| *B60L 53/20* | (2019.01) |

(52) U.S. Cl.
CPC ............... *B60L 53/18* (2019.02); *B60L 58/10* (2019.02); *B60W 20/16* (2016.01); *F01N 11/002* (2013.01); *B60L 53/20* (2019.02); *B60Y 2200/92* (2013.01); *B60Y 2300/474* (2013.01)

(58) Field of Classification Search
CPC ........... B60L 1/04; B60L 58/10; B60W 20/16; B60K 6/54; B60K 6/26; B60K 6/28
USPC .......................................................... 60/320
See application file for complete search history.

(56) References Cited

U.S. PATENT DOCUMENTS

| | | | |
|---|---|---|---|
| 9,249,707 B2* | 2/2016 | Hashimoto | ............... F01N 9/00 |
| 2013/0305692 A1* | 11/2013 | Hashimoto | ........... F01N 3/2013 |
| | | | 60/274 |
| 2015/0075142 A1 | 3/2015 | Hashimoto et al. | |
| 2017/0043757 A1* | 2/2017 | Sujan | ................... B60W 10/08 |

FOREIGN PATENT DOCUMENTS

| | | |
|---|---|---|
| JP | 2011-162040 A | 8/2011 |
| JP | 2012-091728 A | 5/2012 |
| JP | 2015-059438 A | 3/2015 |

OTHER PUBLICATIONS

International Search Report and Written Opinion for related International Application No. PCT/JP2018/015808 dated Jul. 17, 2018; English translation of ISR provided; 9 pages.

* cited by examiner

PLUG-IN HYBRID VEHICLE

CROSS-REFERENCE TO RELATED APPLICATIONS

This application is a U.S. National Stage entry of PCT Application No: PCT/JP2018/015808 filed on Apr. 17, 2018, which claims priority to Japanese Patent Application No. 2017-082607, filed Apr. 19, 2017, the contents of which are incorporated herein by reference.

TECHNICAL FIELD

The present disclosure relates to a plug-in hybrid vehicle, and more particularly to a plug-in hybrid vehicle provided with an exhaust gas purification unit.

BACKGROUND ART

In general, an exhaust purification system of a vehicle includes an oxidation catalyst which oxidizes hydrocarbons (HC) and carbon monoxide (CO) in exhaust gas and a selective reduction catalyst which selectively reduces and purifies nitrogen compounds (NOx) in exhaust gas. The oxidation catalyst and the selective reduction catalyst are inactive at low temperatures, and thus it is necessary for the catalyst temperature to be equal to or higher than the catalyst activation temperature in order to effectively exhibit the exhaust purification performance of those catalysts. In view of those points, for example, Patent Literature 1 discloses a fuel injection control technique for raising the temperature of the oxidation catalyst to be equal to or higher than a catalyst activation temperature by raising the exhaust gas temperature when the temperature of the oxidation catalyst is lower than the catalyst activation temperature.

CITATION LIST

Patent Literature

[Patent Literature 1]: JP-A-2010-31833

SUMMARY OF INVENTION

Technical Problem

In the technique disclosed in Patent Literature 1, only the exhaust gas in the vicinity of an inlet closest to an upstream side of a NOx catalyst is heated, and therefore a sufficient temperature rise effect cannot be obtained, and fuel injection during driving is made a condition. For this reason, when starting a vehicle from a stopped state, it takes time until the catalyst temperature reaches the catalyst activation temperature due to a surrounding environmental temperature, and there is a problem that complicated injection control is required.

The technique of the present disclosure shortens temperature rise time to a catalyst activation temperature by performing heating by a heater unit during battery charging, and improves fuel efficiency performance.

Solution to Problem

According to the present disclosure, there is provided a plug-in hybrid vehicle which includes a fuel-based power unit using combustion of liquid fuel, an electrical power unit that uses electrical power supplied from a rechargeable battery, an exhaust unit that communicates with the fuel-based power unit and discharges exhaust gas generated by the combustion of liquid fuel, an exhaust gas purification unit that is disposed in a middle part of the exhaust unit to remove impurities contained in exhaust gas, and a charging unit that is electrically connected to the battery and charges the battery with external electrical power, wherein the charging unit includes a heater unit which heats the exhaust gas purification unit by electrical power stored in the battery or external electrical power when the external electrical power is charged to the battery in a state where the fuel-based power unit and the electrical power unit are stopped.

In the plug-in hybrid vehicle, the charging unit may stop heating by the heater unit when a temperature from a temperature detection unit which monitors a temperature of the exhaust gas purification unit reaches a predetermined temperature or more.

In the plug-in hybrid vehicle, the charging unit may supply electrical power from the battery and continue heating by the heater unit when the temperature from the temperature detection unit which monitors the temperature of the exhaust gas purification unit has not reached a predetermined temperature or higher in a state where charging of the external electrical power to the battery is stopped and the fuel-based power unit and the electrical power unit start to be driven from the stopped state.

In the plug-in hybrid vehicle, the charging unit may stop the electrical power supply from the battery to the heater unit when a warm-up monitoring unit, which monitors a warm-up state from the start of driving by the fuel-based power unit, detects a warm-up completed state.

In the plug-in hybrid vehicle, in a state where the fuel-based power unit and the electrical power unit stop and charging of the battery with the external electrical power is not performed, when the temperature from the temperature detection unit which monitors the temperature of the exhaust gas purification unit is equal to or lower than a predetermined temperature and when a storage amount of the battery is equal to or more than a predetermined value, the charging unit may supply electrical power from the battery to the heater unit and preheat the exhaust gas purification unit.

In the plug-in hybrid vehicle, it is preferable that the charging unit stop the preheating when the storage amount of the battery becomes equal to or less than a predetermined value.

Advantageous Effects of Invention

According to the technique of the present disclosure, the temperature rise time to the catalyst activation temperature can be shortened by performing heating by the heater unit during battery charging, and fuel efficiency performance can be improved.

DESCRIPTION OF EMBODIMENTS

Hereinafter, a temperature raising device for a catalyst according to an embodiment of the present disclosure will be described based on the attached drawings. The same components are given the same reference numerals and letters and their names and functions are also the same. Therefore, detailed description thereof will not be repeated. Also, when a functional expression is included in the name of each part, the notation of the okurigana (kana written after a kanji character to complete the full reading of the word) is omitted and it is distinguished by the expression of the function itself.

Figure 1:
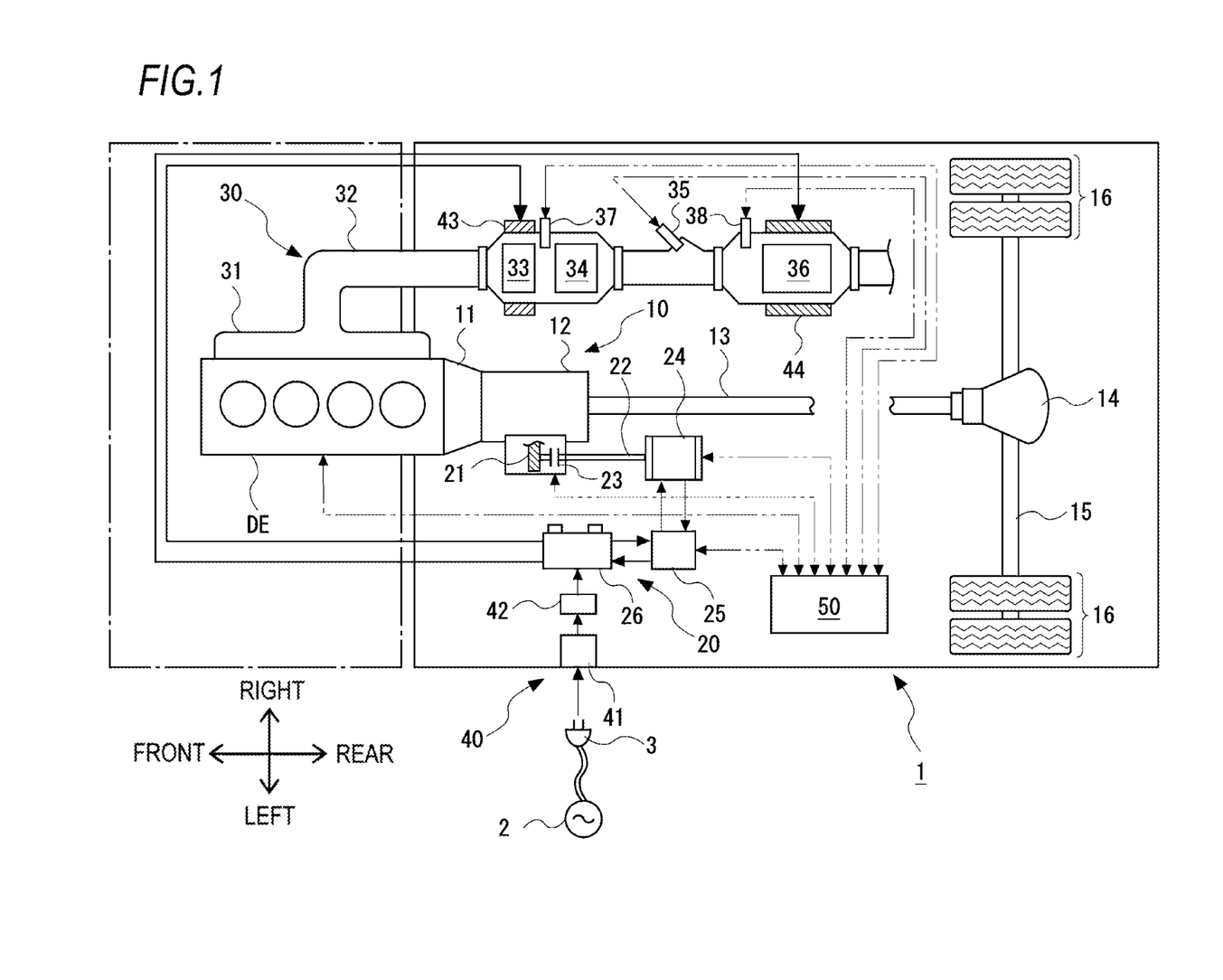
FIG. 1 is a schematic overall configuration diagram illustrating a plug-in hybrid vehicle including a charging system according to an embodiment of the present disclosure.

FIG. 1 is a schematic overall configuration diagram illustrating a plug-in hybrid vehicle (hereinafter, simply referred to as "vehicle") 1 according to the present embodiment. The plug-in hybrid system (also referred to as PHV or the like) is a system in which combination use of an electric vehicle (EV mode) and a hybrid vehicle (HV mode) is possible. Therefore, a mounted battery 26 enables charging with so-called household commercial power supply (external electrical power).

The vehicle 1 is equipped with an engine DE as one of the power sources. For example, a diesel engine is used as the engine DE. Therefore, the engine DE functions as a fuel-based power unit utilizing the combustion of liquid fuel.

Although the detailed configuration (illustration) of the diesel engine is omitted, in the diesel engine, high-pressure fuel stored in a common rail is uniformly supplied to a fuel injectors arranged in each combustion chamber and the high-pressure fuel is injected from the fuel injectors to generate rotational energy by complete combustion by self-ignition.

This reduces the emission of particulate matter (PM) containing carbon (C), which is the source of black smoke and prevents the increase in temperature of the combustion chamber by performing multiple injections, in such a manner that nitrogen oxides (NOx) are reduced. In this case, the fuel injection pressure, the injection timing and number, the injection amount, and the like are finely controlled by an electronic control unit (hereinafter, also simply referred to as "ECU") 50.

In addition, various fuel consumption reduction technologies and exhaust gas reduction technologies can be adopted for the engine DE, which is a diesel engine.

For example, it is possible to employ a turbocharger which improves combustion efficiency by using exhaust energy of the engine DE and a turbocharger with an intercooler which improves combustion efficiency by cooling intake air and reduces the amount of carbon dioxide ($CO_2$) emissions.

In addition, exhaust gas recirculation (EGR) which makes combustion slower and reduces NOx by mixing the exhaust with the intake air again to reduce the oxygen concentration in the combustion chamber can be applied.

Further, a four-valve system which realizes reduction of PM, high output, and improvement of fuel consumption by improving intake and exhaust efficiency by setting two intake and exhaust valves for each cylinder and realizing homogeneous fuel injection by arranging the fuel injector at the center of the combustion chamber may be adopted. Alternatively, variable swirling may be adopted in which the reduction of the exhaust gas and the improvement of the fuel consumption are realized by changing the generation of the swirl that swirls the intake air of the combustion chamber about a central axis.

The engine DE includes a power transmission unit 10 which outputs the generated rotational energy, a power take-off mechanism portion (hereinafter, simply referred to as "PTO") 20, an exhaust treatment unit 30 for processing the exhaust after combustion, an external charging mechanism 40 for charging, and the ECU 50 which controls these electrically.

The power transmission unit 10 includes a clutch device 11, a transmission 12, a propeller shaft 13, a differential gear 14, a drive shaft 15, and left and right drive wheels 16.

The rotational energy generated by the engine DE is transmitted to the transmission 12 in response to ON/OFF of the clutch device 11. The transmission 12 transmits its power to the differential gear 14 while maintaining rotational balance via the propeller shaft 13. The differential gear 14 rotates the drive shaft 15 so as to switch the direction of the rotational force in a direction around an axis of the propeller shaft 13 at a right angle and to maintain the rotational balance during curve traveling. The drive shaft 15 transmits the rotational power to the left and right drive wheels 16.

The power take-off mechanism 20 includes a power take-off gear 21, a PTO shaft 22, a PTO clutch 23, a motor generator 24, an inverter 25, and a rechargeable battery 26. Therefore, the power take-off mechanism 20 functions as an electrical power unit utilizing the electrical power supplied from the rechargeable battery 26.

The power take-off gear 21 constantly meshes with a gear (not illustrated) of the transmission 12. The PTO shaft 22 has one end connected to the power take-off gear 21 and the other end connected to the motor generator 24. The PTO clutch 23 is provided in the PTO shaft 22 and is used to connect or disconnect the power transmitted from the power take-off gear 21 to the motor generator 24 via the PTO shaft 22.

For example, when only the output torque of the engine DE is insufficient for the required torque according to the operation amount of an accelerator pedal (not illustrated) by a driver, the motor generator 24 drives the electrical power supplied to the inverter 25 via the battery 26 as a motor. Also, the driving power of the motor generator 24 assists the rotational power of the left and right drive wheels 16 by the power transmission unit 10 from the power take-off mechanism 20. On the other hand, at the time of deceleration of the vehicle 1, the motor generator 24 drives to generate power by the braking force transmitted from the left and right drive wheels 16 via the power transmission unit 10. The regenerative power associated with this power generation drive is used to charge the battery 26 via the inverter 25.

The exhaust treatment unit 30 includes an exhaust manifold 31, an exhaust passage (exhaust pipe) 32, an oxidation catalyst (hereinafter, also simply referred to as "DOC") 33, a diesel particulate filter (hereinafter, also simply referred to as "DPF") 34, a urea water addition nozzle 35, and a selective catalytic reduction unit (hereinafter, also simply referred to as "SCR") 36. Further, the exhaust treatment unit 30 monitors the temperature by means of a first exhaust temperature sensor 37 and a second exhaust temperature sensor 38 as temperature detection units. Accordingly, the exhaust treatment unit 30 communicates with the engine (fuel-based power unit) DE to constitute an exhaust unit which discharges the exhaust gas generated by the combustion of liquid fuel.

The exhaust manifold 31 communicates with each exhaust port (not illustrated) of the engine DE to discharge the exhaust gas from each exhaust port to one exhaust passage 32.

The DOC 33 and the DPF 34 constitute an exhaust gas purifier (DPF: diesel-particulate-diffuser) which purifies PM contained in the exhaust gas and continuously process PM by repeating filter collection of PM and forced treatment and regeneration of accumulated PM. Therefore, the DOC 33 and the DPF 34 are disposed in the middle part of the exhaust treatment unit (exhaust unit) 30 and function as an exhaust gas purification unit which removes impurities contained in the exhaust gas.

The DOC 33 has a function of reducing PM by oxidizing and purifying SOF composed of unburned fuel and lubricating oil at a predetermined temperature (for example, 200° C.) among PM. For example, the DOC 33 oxidizes unburned substances (SOF) mainly composed of hydrocarbons (HC) contained in PM using oxygen of the exhaust gas using a noble metal such as platinum (Pt) or palladium (Pd) as a catalyst and converts it to water and carbon dioxide. For example, the DOC 33 carries an oxidation catalyst component on a surface of a ceramic carrier such as a honeycomb structure. When HC is supplied by post injection of the engine DE or exhaust pipe injection of an exhaust pipe injector, the DOC 33 oxidizes it to raise the exhaust temperature.

In the DPF 34, for example, a large number of cells partitioned by porous partition walls are arranged along a flow direction of the exhaust and the upstream side and the downstream side of these cells are alternately plugged. The DPF 34 collects PM in the exhaust gas on the pores and surfaces of the partition walls, and when the estimated PM deposition amount reaches a predetermined amount, performs filter forced regeneration (self-regeneration) which burns and removes the PM. The filter forced regeneration is performed by supplying HC to the DOC 33 by post injection or exhaust pipe injection, and raising the temperature of the exhaust gas flowing into the DPF 34 to a PM combustion removal temperature or higher (for example, 600° C. or higher).

As described above, the DPF 34 is a post-processing technology which burns the collected PM efficiently by fine fuel injection of an electronically controlled common rail system and the exhaust temperature control by adoption of an exhaust throttle and the like and self-regenerates the filter function. In this case, the self-regeneration includes regeneration performed automatically while the vehicle is traveling and a so-called forced regeneration in which regeneration is forcedly performed after the vehicle 1 is stopped and PM can hardly be burned and remains in a collected state until it rises the PM combustion removal temperature or higher (for example, 600° C. or higher).

The urea water addition nozzle 35 injects urea water pumped up by a urea water pump from a urea water tank (not illustrated) into the upstream side of the exhaust passage 32 than that of the SCR 36. Urea water injected from the urea water addition nozzle 35 to the exhaust passage 32 can be hydrolyzed by the exhaust heat of the exhaust gas to generate ammonia.

The selective catalytic reduction unit (SCR) 36 carries, for example, zeolite or the like on a porous ceramic support. The SCR 36 exerts a nitrogen oxide purification function to spray the urea water as a reductant from the urea water addition nozzle 35 to the exhaust gas to generate ammonia and to make harmless to water and nitrogen by reacting the ammonia with NOx in the exhaust gas at a predetermined temperature (for example, 200° C.). The SCR 36 has a high NOx reduction rate and thus can mitigate adverse effects on fuel efficiency.

The first exhaust temperature sensor 37 is disposed between the DOC 33 and the DPF 34 to detect the exhaust temperature of the exhaust gas flowing into the DPF 34.

The second exhaust temperature sensor 38 is located the upstream side of the SCR 36 and detects the exhaust temperature of the exhaust gas flowing into the SCR 36.

The external charging mechanism 40 includes a charging port 41 connected to an external electrical power 2 via a charging connector (for example, an outlet) 3, a charger 42, and a first heater unit 43 and a second heater unit 44. Therefore, the external charging mechanism 40 is electrically connected to the battery 26 to function as a charging unit which charges the external electrical power.

The charging port 41 is configured to be insertable with the charging connector 3 connected to the external electrical power 2 via a cable. The charging port 41 is a port having a connection port corresponding to the type of the charging connector 3 and enables, for example, quick charging.

The charger 42 is electrically connected between the charging port 41 and the battery 26 and converts the external electrical power from the charging port 41 into electrical power which can be charged to the battery 26. The external charging mechanism 40 is configured such that, when the charging connector 3 is plugged into the charging port 41 in a state where the vehicle is stopped, the external electrical power supplied from the external electrical power 2 to the charging port 41 via the charging connector 3 is charged to the battery 26 via the charger 42. The charger 42 is designed to monitor the storage amount of the battery 26. Thereby, when the battery 26 reaches a predetermined storage amount, the charging by the external electrical power is finished.

In addition, the charger 42 has a function as a power converter and converts the power supplied from the external electrical power 2 into direct current, for example, to charge the battery 26, which is a lithium ion battery charged and discharged with direct current, with the external electrical power 2 which is a commercial power supply of alternating current. Therefore, the function of the charger 42 may be provided in the charging connector 3 and the charger 42 may be eliminated.

As described above, the DPF 34 can hardly burn PM and keeps collecting the PM until the temperature rises the PM combustion removal temperature or higher (for example, 600° C. or higher). For the DPF 34 to reach the PM combustion removal temperature, for example, continuous travel for about ten minutes is required.

Although it is desirable to finish the charge of the battery 26 in advance prior to use, it is often actually performed just before use. In particular, in commercial vehicles (business vehicles) such as trucks, the usage rate is high. Therefore, in many cases, in a state where the vehicle 1 is stopped (ACC is turned off), charging is performed, for example, in a non-business (traveling) time zone, and then charging is stopped at the next business start and, immediately thereafter, the vehicle 1 is started (ACC is turned on) to start traveling. Therefore, the vehicle 1 must be driven regardless of whether charging has been completed.

Here, in view of the difficulty in securing time to complete the temperature rise of the DPF 34 by idling or the like, the time to reach the PM combustion removal temperature is shortened by forcibly raising the temperature in the upstream side and the downstream side of than that of the DPF 34 during charging.

Specifically, a heating system is employed in which each of heater unit 43 and 44 is configured by electric heaters and disposed the upstream side and the downstream side than the DPF 34. In addition, each of heater units 43 and 44 may be a heating apparatus by another system, or a thermal storage apparatus or thermal storage material of a thermal storage type. Therefore, the external charging mechanism 40 serves as an exhaust gas purification unit disposed in the middle part of the exhaust treatment unit 30 and heats the DOC 33 and the SCR 36 with the each of heater units 43 and 44.

The first heater unit 43 is disposed at the outer peripheral portion of the DOC 33 to heat the DOC 33. Therefore, the purification performance of the DOC 33 can be exhibited. The first heater unit 43 generates heat via the battery 26 when the charging connector 3 is inserted into the charging port 41 when the vehicle is stopped. The first heater unit 43 is electrically connected to the ECU 50 and controlled by the ECU 50. The first heater unit 43 is an electric heater.

The ECU 50 operates the first heater unit 43 when the exhaust temperature measured by the first exhaust temperature sensor 37 is equal to or lower than 200° C. and the ECU 50 controls the first heater unit 43 not to operate when the exhaust temperature measured by the first exhaust temperature sensor 37 is higher than 200° C. Therefore, when the exhaust temperature is higher than 200° C., it is possible to prevent the first heater unit 43 from heating and consuming electrical power unnecessarily. In view of such a situation, the predetermined temperature in the first exhaust temperature sensor 37 as one of the temperature detection units is set to 200° C., but the set temperature is not limited.

The second heater unit 44 is provided on the outer peripheral portion of the SCR 36 to heat the SCR 36. Therefore, the purification performance of the SCR 36 can be exhibited. The second heater unit 44 generates heat via the battery 26 when the charging connector 3 is inserted into the charging port 41 when the vehicle is stopped. The second heater unit 44 is electrically connected to the ECU 50 and controlled by the ECU 50. The second heater unit 44 is an electric heater.

The ECU 50 operates the second heater unit 44 when the exhaust temperature measured by the second exhaust temperature sensor 38 is equal to or lower than 200° C. and the ECU 50 controls the second heater unit 44 not to operate when the exhaust temperature measured by the second exhaust temperature sensor 38 is higher than 200° C. Therefore, when the exhaust temperature is higher than 200° C., it is possible to prevent the second heater unit 44 from heating and consuming electrical power unnecessarily. In view of such a situation, the predetermined temperature in the second exhaust temperature sensor 38 as one of the temperature detection units is set to 200° C., but the set temperature is not limited.

The ECU 50 performs various controls of the vehicle 1 and includes a known CPU, a ROM, a RAM, an input port, an output port, and the like. The ECU 50 is electrically connected to the PTO clutch 23, the motor generator 24, the inverter 25, the urea water addition nozzle 35, the first exhaust temperature sensor 37, the second exhaust temperature sensor 38, the first heater unit 43, and the second heater unit 44.

The ECU 50 monitors the storage amount of the battery 26 and the ON/OFF of the ignition switch (ACC) instead of (or in combination with) the charger 42.

In such a configuration, the vehicle 1 includes the engine DE using combustion of liquid fuel, the power take-off mechanism 20 using the electrical power supplied from the rechargeable battery 26, the exhaust treatment unit 30 which communicates with the engine DE to discharge the exhaust gas generated by the combustion of liquid fuel, the DOC 33 and the SCR 36 arranged in the middle part of the exhaust treatment unit 30 to remove impurities contained in the exhaust gas, and the external charging mechanism 40 which is electrically connected with the battery 26 and charges the external electrical power 2. The external charging mechanism 40 includes the first heater unit 43 and the second heater unit 44 which heat the DOC 33 and the SCR 36 by the electrical power stored in the battery 26 when charging the external electrical power 2 to the battery 26 in a state where each of the power units DE and 20 is stopped.

Next, an example in a case where the ECU 50 controls the heating by each of the heater units 43 and 44 will be described based on a flowchart of FIG. 2.

(Step S1)

In Step S1, the ECU 50 acquires, for example, the elapsed time after the ACC switch is turned off, the ambient temperature from an outside air temperature sensor, and the like, in addition to the temperatures detected by the sensors 37 and 38 when the ACC switch is in the OFF state. Thus, the ECU 50 estimates whether the temperature in the vicinity of the outlet of the DOC 33 and the temperature in the vicinity of the inlet of the SCR are equal to or lower the catalyst activation temperature. That is, it is not necessary to carry out heating despite the fact that the temperatures of the DOC 33 and the SCR 36 are in the vicinity of the catalyst activation temperature, such as immediately after vehicle 1 completes traveling, the ECU 50 estimates in advance whether the temperature is equal to or lower than the catalyst activation temperature based on the elapsed time, the temperature, and the like. Also, because there is a possibility to turn off ACC frequently due to idling regulation or the like, it is not necessary to detect the presence or absence of charging each time, or the like, and thus the ECU 50 estimates in advance whether the temperature is equal to or lower than the catalyst activation temperature based on the elapsed time, the temperature, and the like. Therefore, this routine may not be executed in consideration of the simplification of the ECU 50. When the ECU 50 estimates that the temperature is equal to or lower than the catalyst activation temperature based on the detected temperature and the like from each of the sensors 37 and 38 (Yes), the ECU 50 proceeds to Step S2. The ECU 50 continuously monitors this routine when it does not estimate that the detected temperature from each of the sensors 37 and 38 is equal to or lower than the catalyst activation temperature (No).

(Step S2)

In Step S2, the ECU 50 determines whether the external electrical power charging is performed on the battery 26 by the external charging mechanism 40. When the ECU 50 determines that the external electrical power charging is performed (Yes), the ECU 50 proceeds to Step S3. When the ECU 50 does not determine that the external electrical power charging is performed (No), it continues to monitor this routine.

(Step S3)

In Step S3, the ECU 50 determines whether the storage amount (SOC) of the battery 26 is equal to or more than a predetermined value. When the storage amount of the battery 26 is equal to or more than the predetermined value (Yes), the ECU 50 shifts to Step S4. When the ECU 50 does not determine that the storage amount of the battery 26 is equal to or more than the predetermined value (No), the ECU 50 loops to Step S2 in order to prioritize external charging. Also, the predetermined value for the storage amount of the battery 26 may be converted to a travelable distance or the like, besides the storage amount of the battery 26, such as the approximate traveling distance traveled by using the battery 26 depending on the remaining charge amount when the so-called full charge is set as 100%. In addition, for the storage amount of the battery 26, the approximate drivable time, and the like, a known battery monitoring technology can be used.

(Step S4)

In Step S4, the ECU 50 turns on each of the heater units 43 and 44 by the electrical power supply from the battery 26 and shifts to Step S5.

(Step S5)

In Step S5, the ECU 50 determines whether external charging is continuing. When the ECU 50 determines that the external charging is continuing (Yes), the ECU 50 proceeds to Step S6. When the ECU 50 does not determine that the external charging is continuing (No), that is, when the charging connector 3 is removed from the charging port 41 and the vehicle 1 starts traveling, the process skips to Step S7.

(Step S6)

In Step S6, the ECU 50 monitors whether the temperature from each of the sensors 37 and 38 has reached a predetermined temperature or higher due to the heating of the DOC 33 and the SCR 36 by each of the heater units 43 and 44. When the ECU 50 determines that the predetermined temperature has been reached (Yes), the ECU 50 proceeds to Step S7. When the ECU 50 does not determine that the predetermined temperature has been reached (No), the ECU 50 loops to Step S4 and continues this routine until it determines that the charging is completed or the charging is stopped. In this case, the loop of the ECU 50 may be looped to Step S3. That is, when the consumption (heater heating) is larger than the charge of the battery 26 for some reason (for example, deterioration of the battery 26), in such a case, priority is given to charging because the storage amount of the battery 26 can be decreased.

(Step S7)

In Step S7, the ECU 50 stops the electrical power supply to each of the heater units 43 and 44 and ends this routine. In this case, it is assumed that it takes time for the battery 26 to reach full charge, so this series of routines loop (return) to any routine of Step S1 to Step S3 including an interrupt.

Figure 2:
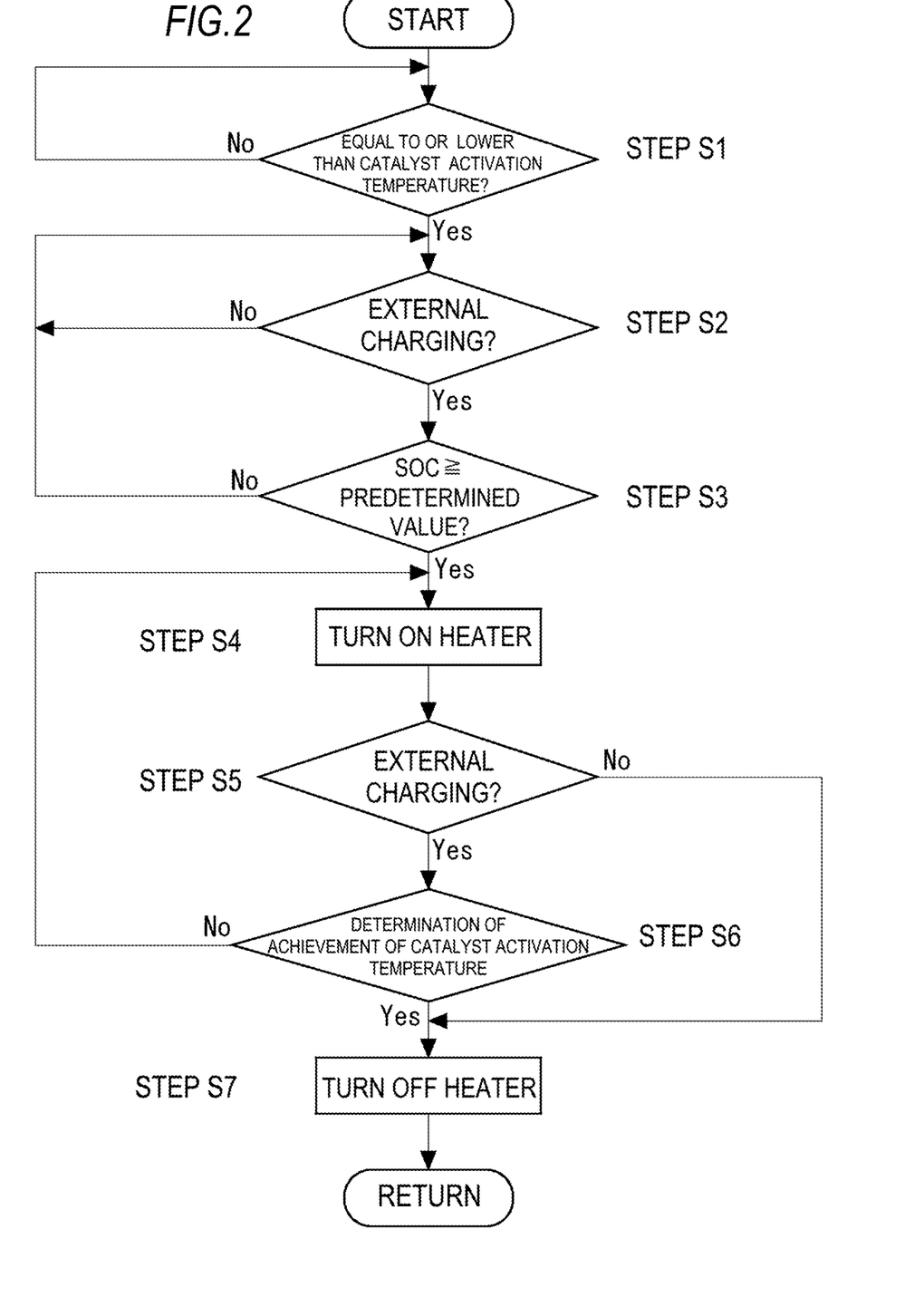
FIG. 2 is a flowchart illustrating an operation of an ECU according to the embodiment of the present disclosure.

In the flow of FIG. 2, the ECU 50 has been described in a case where the DOC 33 and the SCR 36 are heated by each of the heater units 43 and 44 when the external electrical power 2 is charged to the battery 26 in a state where each of the power units DE and 20 is stopped. However, the ECU 50 can perform various controls even when heating or the like is stopped.

For example, the external charging mechanism 40 may stop the heating by each of the heater units 43 and 44 when the temperatures from each of the sensors 37 and 38 which monitor the temperatures of the DOC 33 and the SCR 36 reach a predetermined temperature or higher. As a result, it is not necessary to waste the excessive heating and the storage amount of the battery 26.

Also, the ECU 50 detects the temperatures when charging of the external electrical power to the battery 26 is stopped by the user. Thereafter, it is preferable that, when the drive start of each of the power units DE and 20 is detected, when the temperature from each of the sensors 37 and 38 does not reach a predetermined temperature or higher, the ECU 50 make electrical power supplied from the battery 26 to continue heating by each of the heater units 43 and 44. Thereby, more rapid temperature rise can be secured.

Further, when the ECU 50 detects the warm-up completed state from the start of driving by the engine DE, the ECU 50 may stop the power supply from the battery 26 to the heater units 43 and 44. Accordingly, the ECU 50 contributes to simplification of overall control of the engine.

Also, when each of the power units DE and 20 are stopped and the battery 26 is not charging the external electrical power, when the temperature from each of the sensors 37 and 38 is equal to or lower than a predetermined temperature and the storage amount of the battery 26 is equal to or more than a predetermined value, the ECU 50 may perform preheating.

In preheating, when heating the DOC 33 and the SCR 36 by each of the heater units 43 and 44, the electrical power supply to each of the heater units 43 and 44 is controlled so as to reach a preheating temperature (for example, any temperature in the range of 100° C. to 150° C.) set lower than the predetermined temperature. In this way, heating can be performed in advance in a cold region or the like when there is a surplus in the storage amount of the battery 26.

The external charging mechanism 40 may stop the preheating when the storage amount of the battery 26 becomes equal to or less than a predetermined value, which is to suppress the loss of the storage amount of the battery.

In addition, the present disclosure is not limited to the embodiment described above. Various modifications can be made in appropriate without departing from the scope of the present disclosure.

Figure 3:
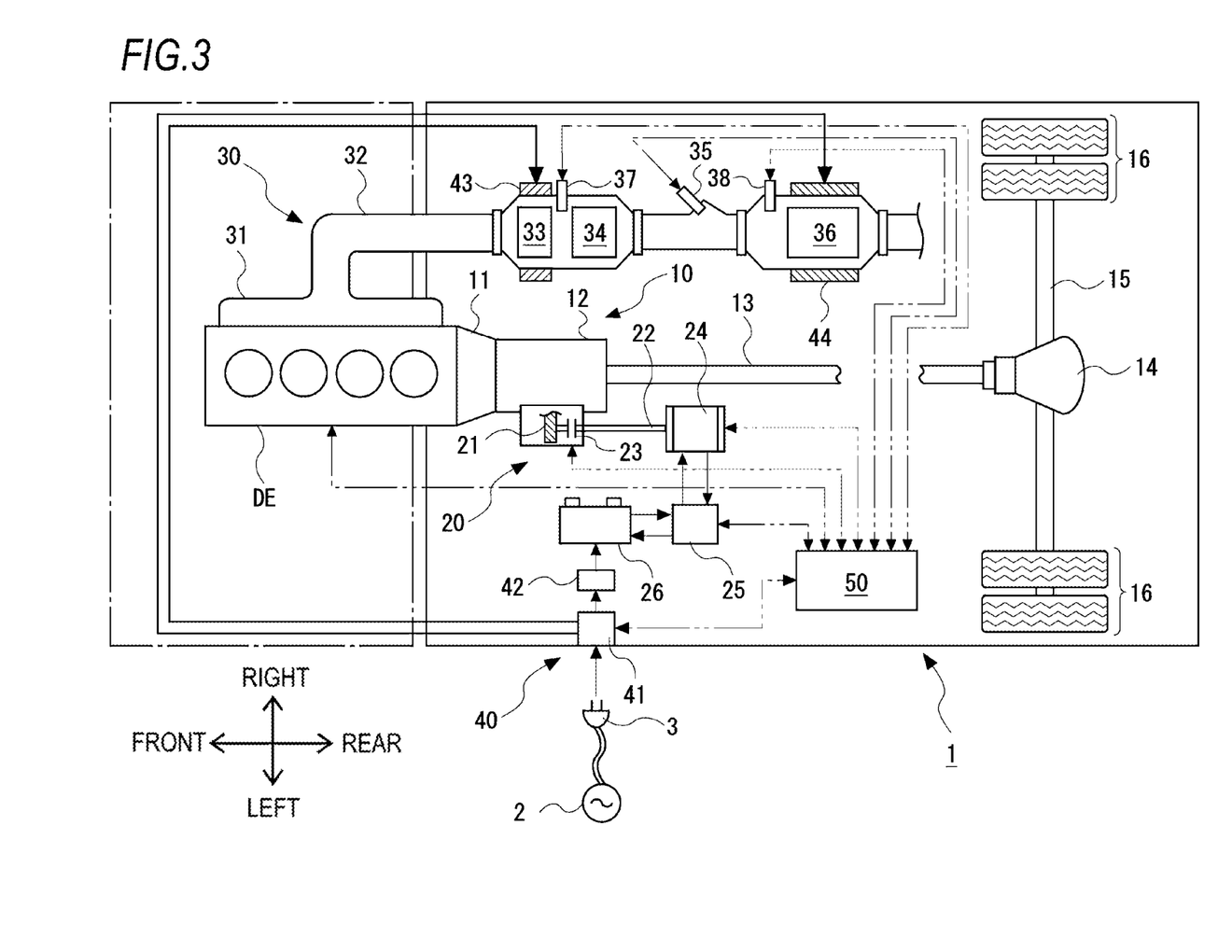
FIG. 3 is a schematic overall configuration diagram illustrating a plug-in hybrid vehicle including another charging system according to the embodiment of the present disclosure.

For example, a configuration where, in each of the heater units 43 and 44, electrical power is supplied from the battery 26 to generate heat when the charging connector 3 is inserted into the charging port 41 when the vehicle is stopped is disclosed. However, as illustrated in FIG. 3, power may be directly supplied from the charging port 41.

Furthermore, the engine DE is not limited to the diesel engine and the present disclosure can be widely applied to other internal combustion engines such as a gasoline engine.

Furthermore, either one of the first heater unit 43 and the second heater unit 44 can be independently ON/OFF-controlled depending on the predetermined temperature detected by the first exhaust temperature sensor 37 and the second exhaust temperature sensor 38. In this case, for example, it can be set or changed in accordance with the material (for example, thickness, size, heat conduction property, and the like) used for the DOC 33 and the SCR 36 to be heated and the catalyst activation temperature.

For example, in the above embodiment, a case where, when charging the battery 26, the first heater unit 43 and the second heater unit 44 heat the DOC 33 and the SCR 36 to the catalyst activation temperature (for example, 200° C.) which can ensure a certain degree of purification rate is exemplified. As a result, the temperatures of the DOC 33 and the SCR 36 can be rapidly raised to the catalyst activation temperature before traveling without significantly reducing the charging efficiency for the battery 26. However, this predetermined temperature may be set to the catalyst activation temperature (for example, 300° C.) at which the purification rate is higher.

The plug-in hybrid vehicle of the present disclosure has the effect of shortening the temperature rise time to the catalyst activation temperature by performing heating by the heater unit at the time of battery charging, and thus improving fuel efficiency performance. The plug-in hybrid vehicle of the present disclosure is applicable to all plug-in hybrid vehicles provided with an exhaust gas purification unit.

This application is based on the Japanese Patent Application (Japanese Patent Application No. 2017-082607) filed on Apr. 19, 2017, the contents of which are incorporated herein by reference.

INDUSTRIAL APPLICABILITY

According to the present disclosure, by performing heating by the heater unit at the time of battery charging, the temperature rise time to a catalyst activation temperature can be shortened and fuel efficiency performance can be improved.

REFERENCE SIGNS LIST

1: Plug-in hybrid vehicle
2: external electrical power (commercial power supply)
3: charging connector
DE: engine
20: power take-off mechanism (PTO)
24: motor generator
26: battery
30: exhaust treatment unit
33: oxidation catalyst (DOC)
34: diesel particulate filter (DPF)
36: selective reduction catalyst (SCR)
37: first exhaust temperature sensor
38: second exhaust temperature sensor
40: external charging mechanism
43: first heater unit
44: second heater unit
50: ECU

The invention claimed is:

1. A plug-in hybrid vehicle comprising:
an engine that uses combustion of liquid fuel;
a power take-off system (PTO) that uses electrical power supplied from a rechargeable battery;
an exhaust passage that communicates with the engine and discharges exhaust gas generated by the combustion of liquid fuel;
an exhaust gas purifier that is disposed in a middle part of the exhaust passage to remove impurities contained in exhaust gas; and
a charger that is electrically connected to the battery and charges the battery with external electrical power,
wherein the charger includes
a heater which heats the exhaust gas purifier by power stored in the battery or external electrical power when the externa electrical power is charged to the battery in a state where the engine and the PTO are stopped, and
the charger supplies electrical power from the battery and continues heating by the heater when a temperature from a temperature sensor which monitors a temperature of the exhaust gas purifier has not reached a predetermined temperature or higher in a state where after charging of the external electrical power to the battery is stopped and the engine and the PTO start to be driven from the stopped state.

2. The plug-in hybrid vehicle according to claim 1, wherein
the charger stops heating by the heater when a temperature from the temperature sensor which monitors the temperature of the exhaust gas purifier reaches a predetermined temperature or higher.

3. The plug-in hybrid vehicle according to claim 1, wherein the charger stops the electrical power supply from the battery to the heater when a warm-up completed state is detected by monitoring a warm-up state from the start of driving by the engine.

4. The plug-in hybrid vehicle according to claim 1, wherein
in a state where the engine and the PTO stop and charging of the battery with the external electrical power is not performed, when the temperature from the temperature sensor which monitors the temperature of the exhaust gas purifier is equal to or lower than a predetermined temperature and when a storage amount of the battery is equal to or more than a predetermined value, the charger supplies electrical power from the battery to the heater and preheats the exhaust gas purifier.

5. The plug-in hybrid vehicle according to claim 4, wherein
the charger stops the preheating when the storage amount of the battery becomes equal to or less than a predetermined value.

* * * * *